United States Patent
Van De Graaf et al.

(10) Patent No.: US 8,900,546 B2
(45) Date of Patent: Dec. 2, 2014

(54) PROCESS TO PREPARE A DILUTED HYDROGEN GAS MIXTURE

(75) Inventors: Wouter David Van De Graaf, Amsterdam (NL); Mark Jan Prins, Amsterdam (NL)

(73) Assignee: Shell Oil Company, Houston, TX (US)

( * ) Notice: Subject to any disclaimer, the term of this patent is extended or adjusted under 35 U.S.C. 154(b) by 40 days.

(21) Appl. No.: 13/393,596

(22) PCT Filed: Sep. 3, 2010

(86) PCT No.: PCT/EP2010/062966
§ 371 (c)(1),
(2), (4) Date: Apr. 4, 2012

(87) PCT Pub. No.: WO2011/026943
PCT Pub. Date: Mar. 10, 2011

(65) Prior Publication Data
US 2012/0195824 A1    Aug. 2, 2012

(30) Foreign Application Priority Data

Sep. 4, 2009 (EP) .................................. 09169455

(51) Int. Cl.
| C01B 3/12 | (2006.01) |
| C01B 3/38 | (2006.01) |
| C01B 3/16 | (2006.01) |
| C01B 3/48 | (2006.01) |
| C10K 1/00 | (2006.01) |
| C10K 3/04 | (2006.01) |

(52) U.S. Cl.
CPC ... *C01B 3/16* (2013.01); *C01B 3/38* (2013.01); *C01B 3/48* (2013.01); *C10K 1/004* (2013.01); *C10K 1/005* (2013.01); *C10K 3/04* (2013.01); *C01B 2203/0233* (2013.01); *C01B 2203/0244* (2013.01); *C01B 2203/0294* (2013.01); *C01B 2203/0405* (2013.01); *C01B 2203/041* (2013.01); *C01B 2203/0475* (2013.01); *C01B 2203/0485* (2013.01); *C01B 2203/06* (2013.01); *C01B 2203/147* (2013.01); *C01B 2203/84* (2013.01); *C10J 2300/1653* (2013.01); *Y02E 20/18* (2013.01)

USPC ............................................. 423/655; 252/373

(58) Field of Classification Search
USPC ........................................................ 423/655
See application file for complete search history.

(56) References Cited

U.S. PATENT DOCUMENTS

| 2004/0244590 A1 | 12/2004 | Ma et al. ........................ 96/11 |
| 2006/0230927 A1 | 10/2006 | Xie et al. ........................ 95/55 |

(Continued)

FOREIGN PATENT DOCUMENTS

| CN | 101208263 A | 6/2008 | |
| EP | 1939138 | 7/2008 | ............ C01B 3/52 |

(Continued)

OTHER PUBLICATIONS

Higman, C. et al; "Gasification"; Elsevier Science, Chapter 5, pp. 85-152, 298-309 and 315-318; 2003.

(Continued)

*Primary Examiner* — Melvin C Mayes
*Assistant Examiner* — Kenneth Vaden

(57) ABSTRACT

Process to prepare a diluted hydrogen gas mixture starting from a gas mixture comprising hydrogen and carbon monoxide by (i) converting part of the carbon monoxide in said gas mixture to hydrogen and carbon dioxide by means of a catalysed water gas shift reaction to obtain a shifted gas and (ii) separating hydrogen from said shifted gas by means of a membrane to obtain the hydrogen comprising gas at the permeate side of the membrane and a carbon dioxide comprising gas at the retentate side of the membrane, wherein at the permeate side of the membrane a sweep gas is provided; (iii) cooling the carbon dioxide comprising gas to obtain liquid carbon dioxide and a gas mixture of non-condensable gasses and (iv) separating the liquid carbon dioxide from the non-condensable gasses; wherein the non-condensable gasses are fed into the hydrogen comprising gas.

13 Claims, 3 Drawing Sheets

(56) References Cited

U.S. PATENT DOCUMENTS

| | | | |
|---|---|---|---|
| 2006/0248800 A1* | 11/2006 | Miglin et al. | 48/198.7 |
| 2007/0000176 A1 | 1/2007 | Liu et al. | 48/198.1 |
| 2008/0087022 A1 | 4/2008 | Briesch et al. | 60/772 |
| 2008/0282882 A1 | 11/2008 | Saukaitis et al. | 95/56 |
| 2009/0117024 A1* | 5/2009 | Weedon et al. | 423/437.1 |

FOREIGN PATENT DOCUMENTS

| | | | | |
|---|---|---|---|---|
| EP | 2023067 | 2/2009 | | F25J 3/06 |
| JP | 09057104 A | 4/1997 | | |
| JP | 2002255506 A | 9/2002 | | |
| WO | WO9930806 | 6/1999 | | B01D 53/22 |
| WO | WO02070402 | 9/2002 | | C01B 3/00 |
| WO | WO2007078277 | 7/2007 | | H01M 8/18 |
| WO | WO2007092844 | 8/2007 | | |
| WO | WO2008118560 | 10/2008 | | B01D 53/22 |

OTHER PUBLICATIONS

Perry's Chemical Engineers' Handbook (8th Edition), by: Green, Don W.; Perry, Robert H. © 2008 McGraw-Hill, pp. 24-42 to 24-44.

* cited by examiner

PROCESS TO PREPARE A DILUTED HYDROGEN GAS MIXTURE

PRIORITY CLAIM

The present application claims priority from PCT/EP2010/062966, filed 3 Sep. 2010, which claims priority from European patent application 09169455.4, filed 4 Sep. 2009.

The present invention is directed to a process to prepare a diluted hydrogen gas mixture starting from a gas mixture comprising hydrogen and carbon monoxide.

Mixtures of hydrogen and carbon monoxide are used as, amongst other things, fuel for gas turbines to prepare power. An example of such a process is the Integrated Gasification Combined Cycle (IGCC) as described in US-A-2008087022. In such a process a mixture of hydrogen and carbon monoxide is obtained by gasification of coal. The mixture contains sulphur compounds which are removed and the cleaned gas mixture is combusted with air in a gas turbine to prepare power. The flue gasses which are emitted by the gas turbine contain significant quantities of carbon dioxide in admixture with nitrogen and steam. In order to limit emissions of carbon dioxide to the environment the process in US-A-2008087022 could be modified to subject the gas mixture comprising hydrogen and carbon monoxide to a water gas shift reaction, wherein carbon monoxide is converted with steam to carbon dioxide and hydrogen. The carbon dioxide is separated from this shifted gas by gas treating processes, such as the Selexol process, and the hydrogen rich remaining gas is used in admixture with nitrogen as fuel in a gas turbine. The flue gasses of the gas turbine will comprise substantially nitrogen and water. The carbon dioxide as isolated by e.g. the Selexol process may have a pressure of between 0.1 and 0.5 MPa. The pressure is typically increased to about 15 MPa making the gasses suited for sub-surface storage.

A disadvantage of the above development is that the efficiency to prepare power of such an adapted IGCC process is reduced because of the additional steps required to capture and store carbon dioxide. There is a desire to prepare a diluted hydrogen gas mixture starting from a mixture of hydrogen and carbon monoxide in a more energy efficient manner.

This object is achieved with the following process: a process to prepare a diluted hydrogen gas mixture starting from a gas mixture comprising hydrogen and carbon monoxide by (i) converting part of the carbon monoxide in said gas mixture to hydrogen and carbon dioxide by means of a catalysed water gas shift reaction to obtain a shifted gas and (ii) separating hydrogen from said shifted gas by means of a membrane to obtain the hydrogen comprising gas at the permeate side of the membrane and a carbon dioxide comprising gas at the retentate side of the membrane, wherein at the permeate side of the membrane a sweep gas is provided. The non-condensable compounds that are obtained when condensed (liquid) carbon dioxide is separated from the carbon dioxide comprising gas obtained in step (ii) are fed either directly or indirectly to the diluted hydrogen gas mixture.

Applicants found that the above process can prepare a diluted hydrogen gas mixture in a more energy efficient manner than prior art processes. Other advantages will be discussed in combination with the preferred embodiments of the present invention.

The mixture comprising hydrogen and carbon monoxide is suitably obtained by gasification, reforming or steam reforming of a gaseous hydrocarbon feedstock or by gasification of a liquid or solid carbonaceous feedstock. Gasification, as described in "Gasification" by C. Higman and M. van der Burgt, 2003, Elsevier Science, Chapter 5, pages 85-152, is a well known technology which can convert the above described gaseous, liquid and solid hydrocarbon feedstocks to a gas comprising hydrogen and carbon monoxide. Reforming, also referred to as auto-thermal reforming, is a well known technology to convert, suitably gaseous, hydrocarbon feedstocks to gas comprising hydrogen and carbon monoxide. The required heat for performing the catalytic reforming reaction is obtained by partially combusting the feed with oxygen. Steam reforming is also a well known technology to convert, suitably gaseous, hydrocarbon feedstocks in the presence of steam to gas comprising hydrogen and carbon monoxide. The required heat for the reforming reaction is provided by indirect heat exchange in a furnace. If the feedstock comprises $C_2$ and higher hydrocarbons it may be advantageous to convert these hydrocarbons to methane in a pre-reformer prior to using this feed in the reforming, steam reforming or gasification process.

Suitable gaseous hydrocarbon feedstocks for the above processes are methane and methane containing gasses comprising hydrocarbons having 1 to 4 carbon atoms, like methane, ethane, propane, butane and iso-butane. Examples of such gasses are natural gas, coal bed methane and gaseous hydrocarbons as produced as by-products of industrial processes, such as the gaseous by-products of typical refinery unit operations such as hydrocracking, catalytic cracking, thermal cracking, or the saturated by-products of a typical steam cracking process, for example methane, or the by-products of a typical Fischer-Tropsch synthesis process, such as for example the Fischer-Tropsch off-gas and the gaseous by-products generated in the hydroprocessing units downstream the Fischer-Tropsch synthesis reactor.

Examples of suitable liquid carbonaceous feedstocks are the liquids as obtained when refining a mineral crude oil. Particular examples are naphtha, kerosene, gas oil and vacuum distillates. Preferred liquid carbonaceous feedstocks are vacuum residues and asphaltenes as obtained when for example de-asphalting a residue fraction. The residue fractions may be directly distilled fractions of a crude mineral oil or alternatively be the residue fraction as isolated from the effluent of a residue conversion process. Such fractions are preferred because they possess a low monetary value. Another liquid feedstock is the asphaltene fraction when de-asphalting a tar sands derived residue fraction. The liquid hydrocarbon feedstock may also be a pyrolysis oil as obtained from biomass sources. Another suitable liquid hydrocarbon feedstock is the ethylene cracker residue as obtained in a steam cracker process.

Examples of suitable solid carbonaceous feedstocks can be petroleum coke (petcoke), coal and biomass. Any combination of the above feedstocks is also possible, for example mixtures of the above described residue and solid biomass. Preferably the biomass is first subjected to a torrefaction pre-treatment before being used as feedstock.

The pressure of the gas mixture of hydrogen and carbon monoxide as provided to step (i) is suitably between 1 and 25 MPa and will be dependent on the pressure at which this gas mixture is prepared. The optimal operating pressure for such preparation step will in turn be dependent on the type of feedstock used.

The water gas shift reaction as performed in step (i) may be any known water gas shift reaction, such as the so-called sour and sweet water gas shift reaction. The catalysed water gas shift reaction is well known and for example described in "Gasification" by C. Higman and M. van der Burgt, 2003, Elsevier Science, Chapter 5, pages 315-318. In case of a sweet water gas shift reaction any sulphur compounds as may be present in the gas mixture comprising hydrogen and carbon monoxide are removed prior to performing step (i). For gas mixtures obtained by reforming or steam reforming, which gas mixtures typically do not contain sulphur compounds, a sweet shift is suitably used.

A disadvantage of the water gas shift reaction is that considerable amounts of water, as steam, are required to perform the reaction. EP-A-1939138 describes a process wherein a hydrogen and halogen containing gas rich in CO is subjected to a water gas shift reaction, wherein the molar ratio of steam to carbon monoxide in the feed to the water gas shift reaction is about 2.8:1. Especially when starting from gas mixtures of hydrogen and carbon monoxide, wherein the carbon monoxide, on a dry basis, in the gas mixture is between 50 and 75 vol. %, large quantities of water, e.g. as steam, will be required. Such gas mixtures, which typically also comprise sulphur compounds, are obtained when prepared by gasification of solid carbonaceous feedstocks such as coal, petcoke and biomass, especially coal.

A more efficient process for such high CO content gas mixtures is by converting the carbon monoxide in step (i) with a low amount of steam in the presence of a catalyst as present in one or more fixed bed reactors. A series of shift reactors may be used wherein in each reactor a water gas shift conversion step is performed. The content of carbon monoxide, on a dry basis, in the feed synthesis gas stream as supplied to the first or only water gas shift reactor is preferably at least 50 vol. %, more preferably between 55 and 70 vol. %. The water gas shift reaction is preferably a sour water gas shift reaction. In order to keep the catalyst sulphided and active the starting gas mixture of hydrogen and carbon monoxide preferably contains hydrogen sulphide. The minimum content of hydrogen sulphide will depend on the operating temperature of the shift reactor, on the space velocity (GHSV) and on the sulphur species present in the feed synthesis gas stream. Preferably at least 300 ppm $H_2S$ is present in the feed synthesis gas stream. There is no limitation on the maximum amount of $H_2S$ from a catalyst activity point of view.

The phrase 'low amount of steam' as used above suitably means a steam/water to carbon monoxide molar ratio as it enters the first or only water gas shift reactor of between 0.2:1 and 0.9:1. The temperature of the feed synthesis gas stream as it enters the shift reactor is preferably between 190 and 230° C. In addition it is preferred that the inlet temperature is between 10 and 60° C. above the dewpoint of the feed to each water gas shift conversion step. The space velocity in the reactor is preferably between 6000-9000 $h^{-1}$. The pressure is preferably between 2 and 5 MPa and more preferably between 3 and 4.5 MPa.

The conversion of carbon monoxide may generally not be 100% because of the sub-stoichiometric amount of steam present in the feed of the reactor. In a preferred embodiment the content of carbon monoxide in the shift reactor effluent, using a fixed bed reactor, will be between 35 and 50 vol. % on a dry basis, when starting from a gas mixture of hydrogen and carbon monoxide comprising between 55 and 70 vol. % carbon monoxide, on a dry basis, and a steam/CO ratio of 0.2 to 0.3 molar. If a further conversion of carbon monoxide is desired, it is preferred to subject the shift reactor effluent to a next water gas shift conversion step.

The preferred steam/water to carbon monoxide molar ratio, inlet temperature and space velocity for such subsequent water gas shift conversion steps is as described for the first water gas shift conversion step. As described above, the starting gas mixture is suitably obtained from a gasification process of a solid carbonaceous feedstock. Such gas mixture is suitably subjected to a water scrubbing step prior to performing step (i) to separate any halogens and/or solids from said mixture. In such a step water will evaporate and end up in the gas mixture. The resultant steam to CO molar ratio in such a scrubbed gas mixture will suitably be within the preferred ranges as described above. This will result in that no steam or water needs to be added to the syngas as it is fed to the first water gas shift conversion step. In order to achieve the desired steam to CO molar ranges for the subsequent steps steam or boiler feed water is suitably added to the effluent of each previous step.

The water gas shift step may be repeated to stepwise lower the carbon monoxide content in the shift reactor effluent of each next shift reactor to a CO content, on a dry basis, of below 5 vol. %. It has been found that in 4 to 5 steps, such a CO conversion can be achieved. These steps may be performed in multiple reactors. Optionally two or more steps may be performed in one reactor vessel, wherein boiler feed water is added at intermediate locations within said reactor vessel.

It has been found that it is important to control the temperature rise in each shift reactor. It is preferred to operate each shift reactor such that the maximum temperature in the catalyst bed in a single reactor does not exceed 440° C. and more preferably does not exceed 400° C. At higher temperatures the exothermal methanation reaction can take place, resulting in an uncontrolled temperature rise.

The catalyst used in the shift reactor is preferably a water gas shift catalyst, which is active at the preferred low steam to CO molar ratio and active at the relatively low inlet temperature without favouring side reactions such as methanation. Suitably the catalyst comprises a carrier and the oxides or sulphides of molybdenum (Mo), more preferably a mixture of the oxides or sulphides of molybdenum (Mo) and cobalt (Co) and even more preferably also comprising copper (Cu) tungsten (W) and/or nickel (Ni). The catalyst suitably also comprises one or more promoters/inhibitors such as potassium (K), lanthanum (La), manganese (Mn), cerium (Ce) and/or zirconium (Zr). The carrier may be a refractory material such as for example alumina, $MgAl_2O_4$ or $MgO$—$Al_2O_3$—$TiO_2$. An example of a suitable catalyst comprises an active $\gamma$-$Al_2O_3$ carrier and between 1-8 wt % CoO and between 6-10 wt % $MoO_3$. The catalyst is preferably present as an extrudate.

In a preferred embodiment of step (i), the gas mixture as used as feed to step (i) comprises at least 50 vol. % of carbon monoxide, and the steam to carbon monoxide molar ratio in the gas mixture as it enters the shift reactor or reactors is preferably between 0.2:1 and 0.9:1 and the temperature of the gas mixture as it enters the shift reactor or reactors is between 190 and 230° C.

The shifted gas as obtained in step (i) preferably has a temperature of between 200 and 300° C. and a pressure of between 2.5 and 6.0 MPa as it is fed to step (ii). If no additional water gas shift activity takes place in step (ii), the content of carbon monoxide in the shifted gas is suitably below 2 vol. %, on a dry basis. The inert, especially nitrogen and argon, content in the shifted gas may range from 0 to 10 vol. %. The source of the nitrogen may be the carrier gas as used to transport solid carbonaceous feedstock to a burner of a gasification process.

Sulphur compounds may be retained in the carbon dioxide comprising gas or be separated from the shifted gas as prepared in a sour shift process prior to performing step (ii), or from the carbon dioxide comprising gas after performing step (ii). This will depend on the tolerance of the membrane to sulphur compounds. Sulphur removal is well known technology and is for example described in "Gasification" by C. Higman and M. van der Burgt, 2003, Elsevier Science, Chapter 5, pages 298-309. An example of a suitable sulphur removal process is the Sulfinol process.

In step (ii) hydrogen is separated from said shifted gas by means of a membrane to obtain the hydrogen comprising gas at the permeate side of the membrane and a carbon dioxide comprising gas at the retentate side of the membrane. At the permeate side of the membrane a sweep gas is provided. By making use of a high-pressure sweep gas less or even no absolute pressure difference is required to provide the driving force for hydrogen to permeate through the membrane. The hydrogen comprising gas as obtained at the permeate side may have a pressure of between 0.2 and 3.5 MPa. The hydrogen partial pressure at the permeate side is below the hydrogen partial pressure of the shifted gas as provided to step (ii).

If the diluted hydrogen gas is used as fuel for a gas turbine, higher pressures are advantageous. In such a case a high-pressure sweep gas having a pressure of between 0.5 and 3.5 MPa is advantageous. Typical pressures at which a hydrogen fuel is provided to a gas turbine are between 2.5 and 4.0 MPa. Compression of the diluted hydrogen gas to the inlet pressure of the gas turbine is required. If the diluted hydrogen gas is used as fuel or fuel component in a common fuel delivery system as applied in refineries, chemical processes or gas to liquids facilities, it is preferred that the pressure at the permeate side is the pressure of said common fuel delivery system. The pressure of the fuel in the common fuel delivery system will depend on the pressure at which the fuel is combusted and is suitably between 0.2 and 1 MPa and preferably between 0.2 and 0.7 MPa and thus compression of the diluted hydrogen gas is not required. In such a case a sweep gas having a pressure of between 0.2 and 1 MPa and preferably between 0.2 and 0.7 MPa is advantageous.

The sweep gas may comprise nitrogen, steam or natural gas or a mixture thereof, depending on the application of the fuel. For use of the fuel in a gas turbine, such as in an IGCC process, the sweep gas comprises nitrogen, preferably more than 70 vol. % nitrogen, and less than 2 vol. % molecular oxygen.

Such a pressurised sweep gas is suitably the nitrogen by-product of a cryogenic air separation unit (ASU). Such a unit may be present to prepare oxygen for a gasification process, which process prepares the mixture of hydrogen and carbon monoxide. The sweep gas may also be the non-condensable gasses which are obtained when condensed (liquid) carbon dioxide is separated from the carbon dioxide comprising gas obtained in step (ii) in a process described in more detail further in this specification or a mixture of such non-condensable gasses and nitrogen from the ASU. The amount of sweep gas is preferably such that the hydrogen content in the diluted gas mixture is between 40 and 65 vol. %.

The membrane used in step (ii) is a so-called $H_2$-selective membrane and it may be any $H_2$-selective membrane known in the art. Preferably, the $H_2$-selective membranes have a permselectivity of $H_2$ over $CO_2$ of at least 30, preferably at least 50. Reference herein to permselectivity of a membrane is to the ratio of the permeance of $H_2$ to the permeance of $CO_2$. The membrane may also be water permeable. This is advantageous when the diluted hydrogen gas mixture needs to be moisturized for use as a fuel in a gas turbine or furnace.

Suitable membranes are capable of operating in the temperature range of 150° C. to 500° C. or in part of said range. Examples of such membranes are silica membranes, organic-inorganic silica hybrid membranes, a blend of silica membranes and organic-inorganic silica hybrid membranes, polymeric membranes or a combination of two or more of the above. Other membranes useful in step (ii) include niobium doped silica, niobium doped organic-inorganic silica hybrid and niobium doped blends of silica and organic-inorganic silica hybrid. Preferred polymeric membranes are polybenzimidazole (PBI), polybenzimadizole/polyimide composite (PBI/PI)

In another preferred embodiment the $H_2$-selective membrane is a membrane, which permits diffusion of essentially pure hydrogen gas. Such $H_2$-selective membranes are preferably comprised of hydrogen-permeable and hydrogen-selective metals. Hydrogen-permeable hydrogen-selective metals and alloys useful for preparing the membrane include Pt, Ni, Au, Pd, Pd—V, Pd—Ta, Pd—Nb, Pd—Ag, Pd—Cu, Pd—Ru, Pd—Rh and Pd—Au. Palladium and its alloys are particularly useful in forming the hydrogen-permeable hydrogen-selective membranes. The hydrogen-permeable hydrogen-selective membrane should be capable of operating in the temperature range of 150° C. to 500° C. or in part of said range.

Hydrogen-permeable hydrogen-selective membranes utilizing palladium or a palladium/silver alloy as a hydrogen-permeable hydrogen-selective membrane layer are for example described in US-A-2004/0244590, WO-A-99/30806 and US-A-2008/0282882. When membranes based on hydrogen-permeable and hydrogen-selective metals are used it is preferred to separate sulphur compounds from the gas mixture comprising hydrogen and carbon monoxide or separated from the shifted gas prior to performing step (ii). This because some membranes, based on hydrogen-permeable and hydrogen-selective metals, may lose their stability when sulphur compounds are present in the gas mixture.

The $H_2$-selective membranes may have any known configuration suitable for application in the present invention. Examples of suitable membrane configurations are, depending on the membrane material, flat sheet, spiral wound, tubular, hollow fibre or monolithic (multi-channel) configurations. The membranes may be positioned in a single membrane unit (stage) or in several units, wherein each unit may be comprised of one or more separate membranes. A possible configuration employing hydrogen selective membranes is described in WO-A-2008118560.

Typically, the number of membrane units will depend on the surface area of the separate membranes in combination with the required quantity of hydrogen to be permeated. The membrane units may comprise hydrogen separation membranes of same or different type in terms of composition or configuration. As a consequence, the membrane units may differ in for instance shape, hydrogen permeance, hydrogen permselectivity and/or surface area available for permeation.

In a preferred embodiment of the invention, the shifted gas as obtained in step (i) is subjected to a further water gas shift in step (ii) in a so-called membrane water gas shift reactor. Membrane water gas shift reactors are known and are for example described in WO-A-2007/078277. In such a reactor a water gas shift reaction takes place at the retentate side of the membrane. The chemical equilibrium of the water gas shift reaction will shift to the product side (towards hydrogen and carbon dioxide) as produced hydrogen continuously permeates the membrane. The sweep gas as used in such a reactor will preferably contain water to avoid that this reactant of the water gas shift reaction permeates the membrane. Preferably the above described membranes based on hydrogen-permeable and hydrogen-selective metals are used. These membranes are advantageous because water will not permeate through such membranes, thereby avoiding the use of a water rich sweep gas.

The carbon dioxide comprising gas as obtained at the retentate side of the membrane in step (ii) is preferably further processed. Suitably the carbon dioxide comprising gas is cooled in a step (iii) to obtain a mixture of liquid carbon dioxide and non-condensable gasses. In a further step (iv) the liquid carbon dioxide is separated from the non-condensable gasses. In case sulphur compounds are retained in the carbon dioxide comprising gas they will be separated together with the carbon dioxide from the non-condensable gasses in step (iv). The resulting mixture, comprising carbon dioxide and i.e. hydrogen sulphide, may be suitably sequestered together.

In such a step (iv) small amounts of carbon dioxide may remain with the non-condensable gasses. This is manageable when the diluted hydrogen gas mixture is used as a fuel. The non-condensable gasses may subsequently be used in step (v) as sweep gas in step (ii). An advantage of these additional steps is that any residual hydrogen present in the carbon dioxide comprising gas will end up in the sweep gas and subsequently in the diluted hydrogen gas mixture. The non-condensable gasses are preferably supplemented with additional nitrogen. The diluted hydrogen gas mixture as obtained by said process may thus contain nitrogen, non-condensable gasses, carbon dioxide and water in addition to hydrogen. However, the liquid carbon dioxide as obtained in step (iv) can be easily pumped and further compressed to make it suited for sub-surface storage.

Cooling step (iii) may be performed by heat exchange with several cold media, such as a refrigerant (e.g., propylene, propane, ethane) from a refrigerant cycle, the pressurized liquid $CO_2$ stream and the non-condensable gasses. The non-condensable gasses can undergo heat exchange directly or be expanded first to, for example to the pressure level of the sweep inlet of the membrane. The additional cooling capacity due to said expansion will depend on the pressure level of the non-condensable gasses and/or the pressure level at the permeate side. In step (iii) the temperature is suitably reduced to a temperature of between −25 and −50° C.

The separation technology used in step (iv) may be any proven gas/liquid separation technology used to capture the liquid $CO_2$ droplets. Such technology includes for instance a flash vessel, demister mat or vane pack, similar as those used in an interstage cooler of a compressor, a swirl tube, centrifuge or cyclone or combinations of two or more of these technologies. Steps (iii) and (iv) may also be combined in a so-called cryogenic distillation or cryogenic flash processes.

In an alternative embodiment, step (iv) may include further carbon dioxide recovery from the non-condensable gasses obtained at the top of the cryogenic separation column by using a carbon dioxide selective membrane, as described in more detail further in this specification.

The invention is also directed to a process to generate power from a gaseous hydrocarbon or a liquid or solid carbonaceous feedstock by preparing a diluted hydrogen gas mixture according to the process of the present invention and providing said diluted hydrogen gas mixture as fuel to a gas turbine to generate power. Applicants have found that especially when the gas mixture comprising hydrogen and carbon monoxide is obtained by gasification of coal a more efficient process is obtained as compared to the traditional IGCC processes which include capture of carbon dioxide as described in the introductory part of this specification.

The invention is also directed to a process to operate more than one furnace, which furnaces run on a fuel as provided by a common fuel delivery system, wherein to said fuel delivery system the diluted hydrogen gas mixture is provided as prepared by the process of the present invention. The advantage and background to this embodiment will be described hereinbelow.

In many industrial processes, such as refineries, chemical plants and the like, a common fuel delivery system is used to provide fuel to various furnaces used in said industrial processes.

With a furnace is meant a device for increasing the temperature of a fluid or gas as flowing through one or more conduits by means of indirect heat exchange against combustion gasses providing heat to said fluid or gas. Such furnaces are well known and described in Perry's Chemical Engineers' Handbook (8th Edition), by: Green, Don W.; Perry, Robert H. ©2008 McGraw-Hill, pages 24-42 to 24-44. Examples of such furnaces are boilers in which steam is generated and the distillation feed and reboiler furnaces as used in many processes. The furnace can also be used to increase the temperature of a feed to a chemical reaction step. With a furnace is also meant a chemical reactor in which an endothermic reaction takes place. Suitably such a reaction takes place in one or more conduits and the required heat for the reaction is provided by means of indirect heat exchange against combustion gasses. Examples of suited furnaces for performing chemical reactions are steam cracking furnaces to prepare lower olefins and conventional steam reforming reactors.

The furnaces are thus used to generate steam, heat up feed streams, operate distillation equipment and/or perform chemical reactions. In a typical operation a hydrocarbon-based fuel is combusted with air in such a furnace resulting in a flue gas containing carbon dioxide. This flue gas is typically discharged into the environment via various stacks. Presently there is a desire to limit the amount of carbon dioxide discharged into the environment. A possible solution would be to capture the $CO_2$ from the flue gas as it is discharged from the various stacks. Capturing carbon dioxide from the numerous stacks is not attractive because of the high number of stacks, the typically scattered locations of these stacks across the industrial process and the low release pressure and high dilution of $CO_2$ in the flue gas. All these factors alone or in combination make it difficult to capture $CO_2$ from these flue gasses.

The hydrogen as added to the common fuel system and used in the furnaces will replace all or part of the typically used hydrocarbon based fuel. As a result the amount of carbon dioxide as emitted via the stacks of the furnaces can be reduced significantly. A further advantage is that an existing process comprising the operation of more than one furnace, which furnaces run on a fuel as provided by a common fuel delivery system, can be easily adapted to this embodiment of the present invention.

The process comprising the operation of more than one furnace may be processes comprising any of the above furnace types or combinations of said furnaces. Examples of processes comprising the operation of more than one furnace, which furnaces run on the same fuel as provided by a common fuel delivery system are crude oil refineries, steam crackers, methanol plants, methanol to olefins plants, liquid natural gas plants (LNG), gas to liquids (GTL), biomass to liquids (BTL) and coal to liquids plants (CTL). With a gas, biomass or coal to liquids plant is here meant a process wherein this feed is first converted to a mixture of carbon monoxide and hydrogen and wherein this gas mixture is used to perform a Fischer-Tropsch reaction to obtain a paraffin waxy product, which is suitably upgraded to liquids by means of one or more hydroprocessing steps.

Not all furnaces need to be fuelled by the common fuel delivery system. The advantages of the present invention can also be achieved when only part of the total of all the furnaces of a process use the fuel comprising the added hydrogen. Suitably all of the furnaces use the fuel as provided by the common fuel system to take full benefit of the advantages of the present invention. Suitably the process comprises more than 5 furnaces, more preferably more than 10 furnaces and even more preferably more than 20 furnaces connected to the common fuel delivery system. It is obvious that the greater the number of furnaces the greater the advantage as compared to a situation where $CO_2$ has to be captured at every furnace separately. Preferably at least 90% of the total number of furnaces uses the fuel as provided by the common fuel delivery system.

The heat exchange in the furnace may be radiant and/or convective. The combustion gasses are obtained by combustion of a fuel with air, typically in multiple burners per furnace.

The fuel as provided by a common fuel delivery system to said furnaces may comprise fully or partly of the diluted hydrogen gas mixture. The fuel may also comprise hydrocarbons having 1 to 4 carbon atoms, like methane, ethane, propane, butane and iso-butane. If the fuel in the common fuel system comprises a high content of hydrogen it may be advantageous to use specially adapted burners in the furnaces, which reduce the NOx formation during combustion.

The invention is especially directed to a refinery process and wherein the gas mixture of hydrogen and carbon monoxide is prepared by reforming, steam reforming or gasification of a gaseous fuel comprising hydrocarbons having 1 to 4 carbon atoms, gasification of a liquid residue or gasification of a solid petroleum coke.

The invention will be illustrated making use of FIGS. 1, 1A, 2, 2A and 3.

Figure 1:
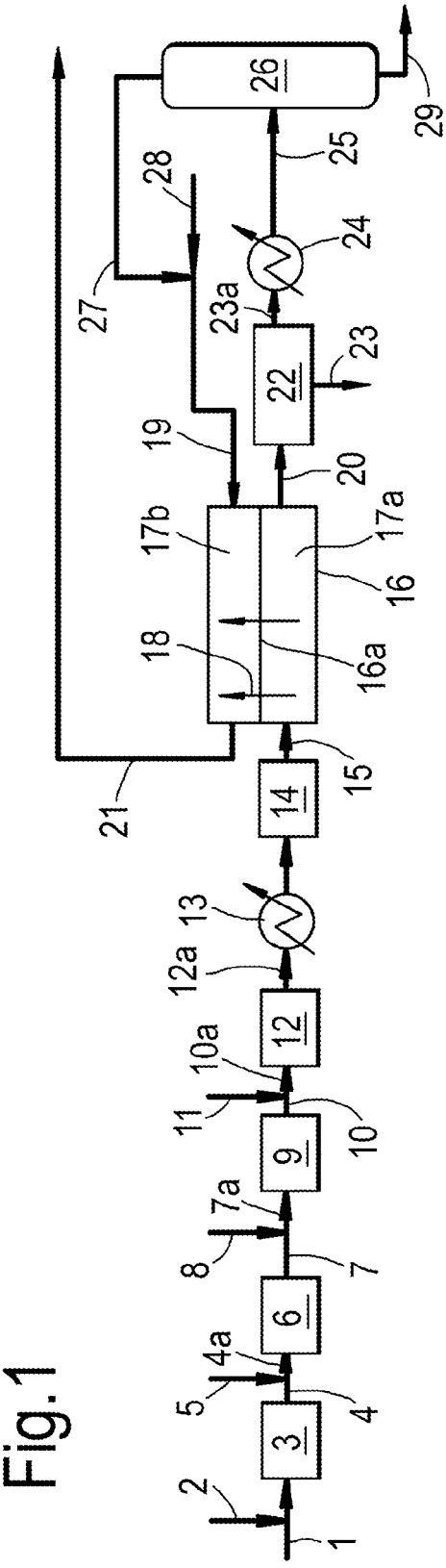
FIG. 1 illustrates a process according to the invention comprising a step wise water gas shift process and a non-integrated membrane unit.
Figure 2:
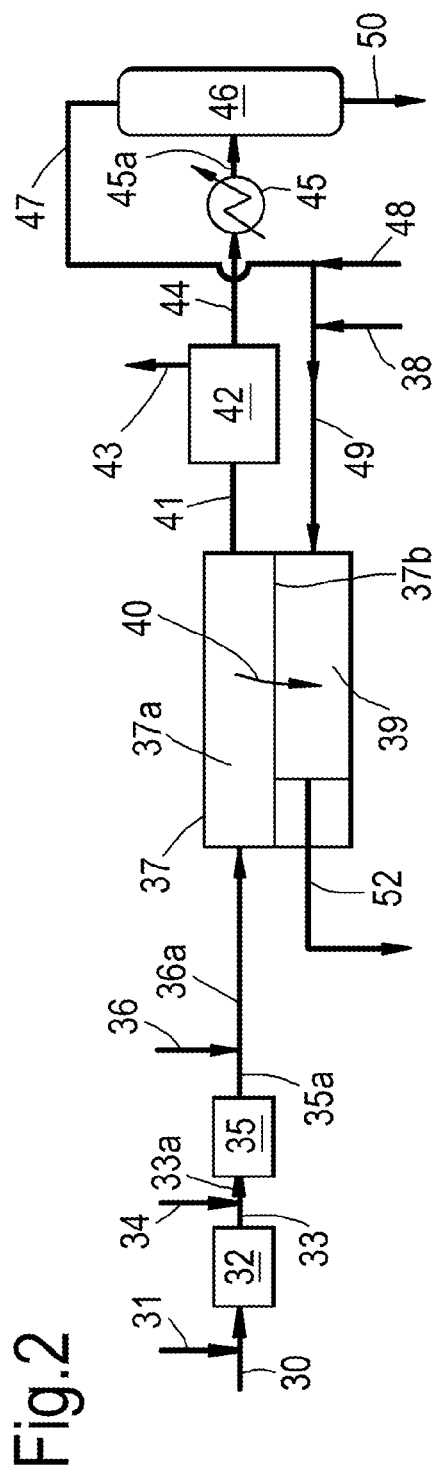
FIG. 2 illustrates a preferred embodiment of the process according to the invention comprising a step wise water gas shift process and so-called membrane water gas shift reactor.
Figure 1A:
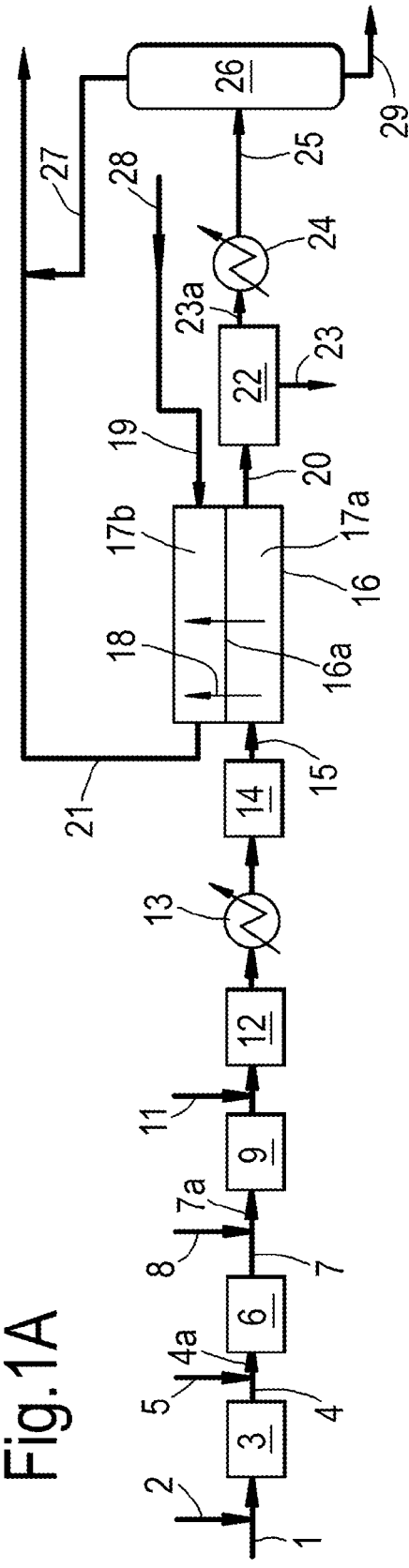
Figure 2A:
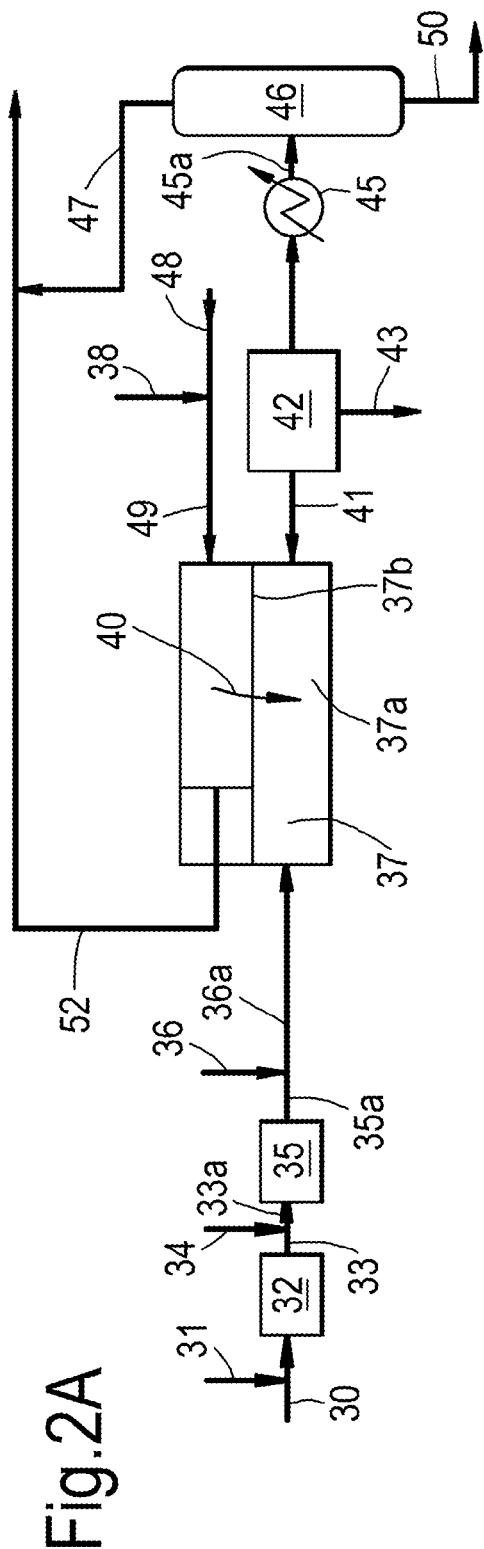
Figure 3:
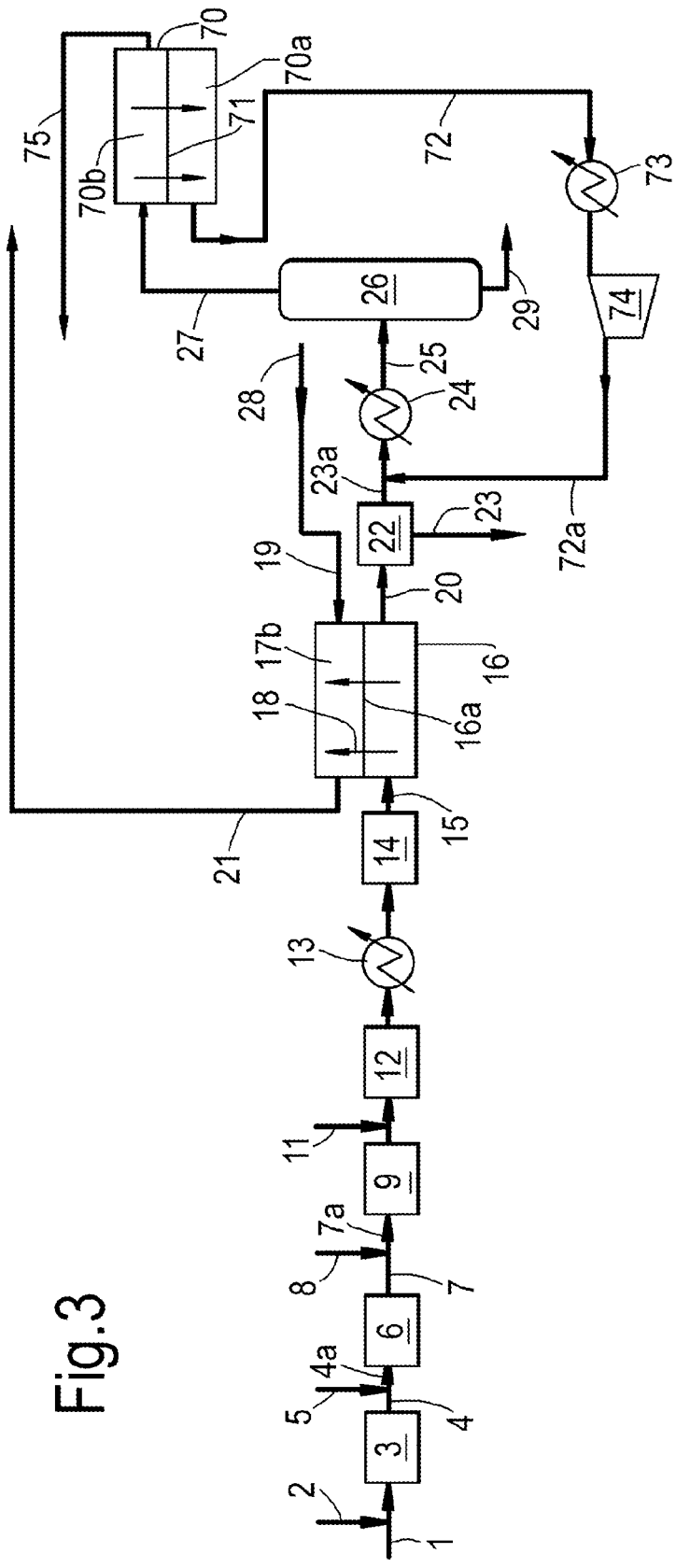

FIGS. 1A, 2A and 3 describe alternative embodiments of the invention as discussed in more detail herein.

FIG. 1 illustrates a process according to the invention. The figure will be described in combination with a working example. The conditions mentioned do not limit the invention to this embodiment. The conditions are merely intended to provide an illustration of the invention.

To a first water gas shift (WGS) reactor 3a water saturated mixture 1 of hydrogen and carbon monoxide as obtained by coal gasification and water scrubbing is fed having a pressure of 4.8 MPa and a temperature of 205° C. This temperature needs to be sufficiently above the dewpoint to avoid condensation in the shift reactor 3. This temperature may be achieved by the use of a heat exchanger (not shown) or by the addition of superheated steam 2. The water to CO molar ratio of mixture 1 is 0.33 [mol]/[mol]. The effluent 4 of the WGS reactor 3 has a temperature of 380° C. To said effluent boiler feed water 5 is added thereby reducing the temperature to 220° C. The water to CO molar ratio of mixture 4a is 0.53 [mol]/[mol]. This stream 4a is used as feed to a second WGS reactor 6. To effluent 7, having a temperature of 310° C. boiler feed water 8 is added to obtain a mixture 7a having a water to CO molar ratio of 0.73 [mol]/[mol]. The mixture 7a is fed to third WGS reactor 9. To effluent 10, having a temperature of 340° C. boiler feed water 11 is added to obtain a mixture 10a having a water to CO molar ratio of 1.48 [mol]/[mol]. The mixture 10a is fed to fourth WGS reactor 12. Effluent 12a of reactor 12, having a temperature of 280° C. is cooled in waste heat boiler 13 to 200° C. and fed to fifth WGS reactor 14. The effluent 15 of this reactor 14, having a temperature of 220° C. and a pressure of 4.4 MPa, is fed to the feed or retentate side 17a of a membrane unit 16. Hydrogen and water 18 will pass membrane 16a to the permeate side 17b of membrane unit 16. To the permeate side 17b a sweep gas 19 is provided. A diluted hydrogen gas mixture 21 is discharged from the permeate side 17b of the unit 16 having a pressure of 2.5 MPa and a temperature of 220° C. Sulphur compounds 23 are removed in treating unit 22 from the carbon dioxide comprising gas 20 as obtained in the membrane unit 16. The treated gas 23a is subsequently reduced in temperature by indirect heat exchange against stream 27 (not shown) and against the liquid $CO_2$ stream 29 after pressurization of the liquid $CO_2$ (pressurization and heat exchange not shown) and against a propane refrigerant to a temperature of −40° C. in indirect heat exchanger 24 to obtain a mixture 25 of liquid carbon dioxide and non-condensable gasses. In flash vessel 26 liquid carbon dioxide 29 is separated from the non-condensable gasses 27, which comprise residual hydrogen, nitrogen, argon and carbon monoxide. The liquid carbon dioxide having a pressure of 4.27 MPa can easily be further compressed to 15 MPa, making it suited for sub-surface storage. The non-condensable gasses 27 and nitrogen 28 as obtained in a cryogenic air separation unit are used as sweep gas 19 to obtain diluted hydrogen gas mixture 21. If the diluted hydrogen gas mixture 21 is required at higher pressure in, for example, a gas turbine, a compressor (not shown) may be used to increase the pressure of the diluted hydrogen gas mixture 21 exiting the unit 16 to approximately the same pressure as the inlet pressure of the gas turbine.

Applicants found that the efficiency of an IGCC process starting from coal can be improved by at least 1% of the thermal heat of combustion. This is for a situation when the process according to FIG. 1 is used instead of a conventional IGCC line-up with carbon capture. The prior art process comprises a standard water gas shift step, a Selexol gas treating process and pressurisation of the carbon dioxide to 15 MPa.

FIG. 1A describes an alternative embodiment of FIG. 1. The process shown in FIG. 1A proceeds in the same manner as in FIG. 1, except that the non-condensable gasses 27 are fed directly into the diluted hydrogen gas mixture 21. From an energy efficiency point of view, it is advantageous for the diluted hydrogen gas mixture 21 to be at the same pressure as the non-condensable gasses 27. If a higher pressure diluted hydrogen gas mixture 21 is desired, a compressor may be used to increase the pressure of the diluted hydrogen gas mixture 21 exiting the unit 16 to approximately the same pressure as that of the non-condensable gasses 27. The compressed diluted hydrogen gas mixture 21 may then be mixed with the non-condensable gasses 27 prior to the use of such combined stream as fuel in, for example, a combined cycle (as a part of the IGCC process).

FIG. 2 describes an embodiment of the invention wherein the shifted gas is subjected to a further water gas shift in a so-called membrane water gas shift reactor. To a first water gas shift (WGS) reactor 32a water saturated mixture 30 of hydrogen and carbon monoxide as obtained by coal gasification and water scrubbing is fed having a pressure of 4.8 MPa and a temperature of 205° C. The water to CO molar ratio of mixture 31 is 0.33 [mol]/[mol]. The effluent 33 of the WGS reactor 32 has a temperature of 380° C. To said effluent boiler feed water 34 is added thereby reducing the temperature to 220° C. The water to CO molar ratio of mixture 33a is 0.53 [mol]/[mol]. This stream 33a is used as feed to a second WGS reactor 35. To effluent 35a, having a temperature of 310° C. boiler feed water 36 is added to obtain a mixture 36a having a water to CO molar ratio of 0.73 [mol]/[mol]. The mixture 36a is fed to the retentate side 37a of a membrane water gas shift reactor 37. The temperature at the retentate side 37a is kept at 400° C. and at a pressure of 4.2 MPa. Hydrogen and water will pass the membrane 37b in the direction 40 to the permeate side 39 of the reactor. The sweep gas 49 typically contains water and nitrogen in order to avoid that too much water passes the membrane. The latter would result in that the driving force for the water gas shift reaction is lowered. If a membrane based on a hydrogen-permeable and hydrogen-selective metal is used in the reactor sulphur compounds are suitably separated from the shifted gas prior to feeding said gas to reactor 37. In FIG. 2 a sulphur tolerant membrane is used. The sulphur compounds 43 as present in the carbon dioxide rich gas 41 as discharged from the retentate side 37a of the reactor 37 are separated in treating unit 42. The treated gas 44 is subsequently reduced in temperature against stream 57 (not shown), air (not shown), stream 51 (not shown), and a propane refrigerant to a temperature of −40° C. in indirect heat exchanger 45 to obtain a mixture 45a of liquid carbon dioxide and non-condensable gasses. In flash vessel 46 liquid carbon dioxide 50 is separated from the non-condensable gasses 47, which comprise residual hydrogen, nitrogen, argon and carbon monoxide. The liquid carbon dioxide having a pressure of 4.27 MPa can easily be further compressed to 15 MPa, making it suited for sub-surface storage. Water 38, the non-condensable gasses 47 and nitrogen 48 as obtained in a cryogenic air separation unit are used as sweep gas 49 to obtain diluted hydrogen gas mixture 52. If the diluted hydrogen gas mixture is required at higher pressure in, for example, a gas turbine, a compressor (not shown) may be used to increase the pressure of the diluted hydrogen gas mixture 52 exiting the unit 37 to approximately the same pressure as the inlet pressure of the gas turbine.

FIG. 2A describes an alternative embodiment of FIG. 2. The process shown in FIG. 2A proceeds in the same manner as in FIG. 2, except that the non-condensable gasses 47 are fed directly into the diluted hydrogen gas mixture 52. As was the case in the process described in FIG. 1A, it is advantageous for the diluted hydrogen gas mixture 52 to be at about the same pressure as the non-condensable gasses 47 therefore, a compressor (not shown) may be used to increase the pressure of the diluted hydrogen gas mixture 52 exiting the membrane water gas shift reactor 37 to approximately the same pressure as that of the non-condensable gasses 47. The compressed diluted hydrogen gas mixture 52 may then be mixed with the non-condensable gasses 47 prior to the use of such combined stream as fuel in, for example, a combined cycle (as a part of the IGCC process).

FIG. 3 describes another alternative embodiment of the present invention. In this embodiment, the non-condensable gasses 27 obtained at the top of the flash vessel 26 are purified further by using a carbon dioxide selective membrane 71. Such membrane consists of a polymeric membrane, such as (crosslinked) polyethyleneoxide, other rubbery membrane materials or contains segments of such other rubbery materials, and is operated at low temperatures—in the range of −55° C. to −10° C., preferably similar to the operating temperatures in the flash vessel 26. Carbon dioxide selective membrane 71 contained in membrane unit 70 separates the non-condensable gasses into a $CO_2$ lean non-condensable gas stream 75 and a $CO_2$ permeate stream 72.

The process proceeds in a similar manner to the process shown in FIG. 1; however, the non-condensable gasses 27 are fed directly to membrane unit 70. The carbon dioxide rich permeate stream 72 can be recompressed in compressor 74 to form a higher pressure carbon dioxide rich permeate stream 72a and recycled to cooling step (iii) via the treated gas stream 23a. Both the carbon dioxide rich permeate stream 72 and the non-condensable gas stream 75 provide some of the heat capacity to be used as a heat sink against the $CO_2$ rich treated gas stream 23a in the cryogenic heat exchanger 24. The remainder of the required heat capacity to cool treated gas stream 23a in heat exchanger 24 is generated by heat exchange with the liquid $CO_2$ stream 29 after pressurization (pressurization and heat exchange not shown) and a refrigerant chilling cycle (not shown). Additional cooling capacity is generated in the membrane unit 70 by the Joule-Thompson effect of permeation, allowing for additional cooling capacity. The non-condensable gasses stream 75 may be fed directly into the diluted hydrogen gas mixture 21 as part of the fuel mixture in the same manner as shown in FIG. 1A or used along with nitrogen 28 as sweep gas 19 as shown in FIG. 1. If a higher pressure diluted hydrogen gas mixture 21 is required, then a compressor (not shown) may be used to increase the pressure of the diluted hydrogen gas mixture 21 in the same manner as in the other embodiments of the invention. Membrane unit 16 may also be replaced by membrane water gas shift reactor 37, as described with respect to FIG. 2. For use in connection with IGCC or other usages involving gas turbines, the amount of non-condensable gasses in the fuel mixture or sweep gas is preferably such that the hydrogen content in the diluted gas mixture is between 40 and 65 vol. %. When using the fuel mixture for other applications, the hydrogen content may be up to 90 vol. % (on dry basis).

The foregoing $CO_2$ recovery process provides the following advantages over similar processes without such $CO_2$ recovery step: (1) The $CO_2$ losses to the diluted hydrogen gas mixture 21 and non-condensable gasses 27 can be reduced further compared to a $CO_2$ liquefaction without the carbon dioxide selective membrane unit 70. The separation step does not contaminate the $CO_2$ stream with, for example, water or ammonia. Also, as the liquefaction system is fully dry, not adding water or chemicals (like ammonia) to stream 72 allows for recirculation to the inlet of the CO2 liquefaction system without additional treatment (e.g. drying). (3) The system gains flexibility in that the $CO_2$ liquefaction can be conducted at higher temperatures and/or lower pressures, as opposed to a larger $CO_2$ selective membrane, larger $CO_2$ rich recycle stream and additional compression requirement, allowing for further process optimization. Furthermore, the combined system of $CO_2$ liquefaction and $CO_2$ selective membranes allows $CO_2$ streams of lesser purity, also allowing for further process optimization. For example, when a smaller (and less expensive) $H_2$ selective membrane 16 is used, more hydrogen remains in the $CO_2$ rich retentate stream 20. In the subsequent liquefaction step, the non-condensable gasses 27 stream will be larger and more $CO_2$ will remain in this non-condensable gasses stream 27. Normally this would result in unacceptable $CO_2$ losses to the fuel 21. With the addition of the $CO_2$ selective membrane unit 70 and compressor 74, this $CO_2$ can be recovered and recycled to stream 23, making it possible to have a smaller (and less expensive) $H_2$ selective membrane and still achieve the required $CO_2$ recovery. This recovered CO2 will end up in the liquid $CO_2$ stream 29.

What is claimed is:

1. A process to prepare a diluted hydrogen gas mixture starting from a gas mixture comprising hydrogen and carbon monoxide by
   (i) converting part of the carbon monoxide in said gas mixture to hydrogen and carbon dioxide by means of a catalyzed water gas shift reaction to obtain a shifted gas;
   (ii) separating hydrogen from said shifted gas by means of a membrane to obtain the hydrogen comprising gas at the permeate side of the membrane and a carbon dioxide comprising gas at the retentate side of the membrane, wherein at the permeate side of the membrane a sweep gas comprising nitrogen, steam or natural gas or a mixture thereof is provided;

(iii) cooling the carbon dioxide comprising gas to obtain liquid carbon dioxide and a gas mixture of non-condensable gasses; and (iv) separating the liquid carbon dioxide from the non-condensable gasses;

wherein the non-condensable gasses are used to supplement the sweep gas at the permeate side of the membrane in step (ii).

2. The process according to claim 1, wherein the membrane is a H2-selective membrane having a permselectivity of H2 over CO2 of at least 30.

3. The process according to claim 1, wherein the membrane is a silica, organic-inorganic silica hybrid membrane, a blend of silica and organic-inorganic silica hybrid, PBI, PBI/PI membranes or a combination of two or more of the above.

4. The process according to claim 1, wherein the membrane is comprised of a hydrogen-permeable and hydrogen-selective metal.

5. The process according to claim 4, wherein the hydrogen-selective metal is one of the following metals or alloys Pt, Ni, Au, Pd, Pd—V, Pd—Ta, Pd—Nb, Pd—Ag, Pd—Cu and Pd—Au, Pd—Rh, Pd—Ru.

6. The process according to claim 1, wherein the shifted gas as obtained in step (i) is subjected to a further water gas shift in step (ii) in a membrane water gas shift reactor.

7. The process according to claim 1, wherein step (i) is performed by feeding a gas mixture comprising hydrogen and carbon monoxide and having a steam to carbon monoxide molar ratio of between 0.2:1 and 0.9:1 to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C.

8. The process according to claim 1, wherein the gas mixture comprising hydrogen and carbon monoxide is obtained by gasification, auto thermal reforming or steam reforming of a gaseous hydrocarbon feedstock or by gasification of a liquid or solid carbonaceous feedstock.

9. The process according to claim 1, wherein the non-condensable gasses are subjected to a CO2 recovery step prior to being fed into the hydrogen comprising gas.

10. The process according to claim 9, wherein a CO2-rich gas is recovered from the non-condensable gasses by the use of a polymeric gas separation membrane operating at temperatures between −55° C. and −10° C., and said CO2-rich gas is recompressed and recycled to step (iii).

11. The process according to claim 10, in which the membrane comprises a polymeric membrane.

12. A process to generate power from a gaseous hydrocarbon or a liquid or solid carbonaceous feedstock by preparing a diluted hydrogen gas mixture according to the process of claim 1 and providing said diluted hydrogen gas mixture as fuel to a gas turbine to generate power.

13. A process to operate more than one furnace, which furnaces run on a fuel as provided by a common fuel delivery system, wherein to said fuel delivery system the diluted hydrogen gas mixture is provided as prepared by the process of claim 1.

* * * * *